United States Patent [19]

Lanning et al.

[11] 4,140,092

[45] * Feb. 20, 1979

[54] CONTROL SYSTEM FOR INTERNAL COMBUSTION ENGINE

[75] Inventors: William C. Lanning, Santa Ana; Caleb V. Swanson, Orange, both of Calif.

[73] Assignee: Air Quality Products, Inc., Orange, Calif.

[*] Notice: The portion of the term of this patent subsequent to Aug. 20, 1990, has been disclaimed.

[21] Appl. No.: 810,211

[22] Filed: Jun. 27, 1977

Related U.S. Application Data

[63] Continuation of Ser. No. 677,548, Apr. 16, 1976, abandoned, which is a continuation of Ser. No. 539,248, Jan. 7, 1975, abandoned, which is a continuation of Ser. No. 412,955, Nov. 5, 1973, abandoned, which is a continuation of Ser. No. 204,128, Dec. 2, 1971, abandoned.

[51] Int. Cl.² ............................ F02P 5/04; F02P 1/08
[52] U.S. Cl. ............................ 123/117 A; 123/117 R; 123/148 E
[58] Field of Search ....... 123/117 R, 117 A, 146.5 A, 123/148 E, 102

[56] References Cited

U.S. PATENT DOCUMENTS

| 3,272,191 | 9/1966  | Walker    | 123/117 A |
| 3,314,407 | 4/1967  | Schneider | 123/148 E |
| 3,317,260 | 6/1970  | Oishi     | 123/102   |
| 3,357,114 | 12/1967 | Green     | 123/148 E |
| 3,581,720 | 6/1971  | Hemphill  | 123/102   |
| 3,592,178 | 7/1971  | Schiff    | 123/117 R |
| 3,603,298 | 9/1971  | Toda      | 123/117 A |
| 3,654,910 | 4/1972  | Kuehn     | 123/148 E |
| 3,660,689 | 5/1972  | Oishi et al. | 123/148 E |
| 3,687,120 | 9/1972  | Lenz      | 123/117 A |
| 3,735,743 | 5/1973  | Shimizu   | 123/117 A |

OTHER PUBLICATIONS

Popular Electronics, Nov. 66, pp. 53-56, 101.
The Design, Development & Application of Exhaust Emission Control Devices; DeForge Fedman.

Primary Examiner—Charles J. Myhre
Assistant Examiner—P. S. Lall
Attorney, Agent, or Firm—Knobbe, Martens, Olson, Hubbard & Bear

[57] ABSTRACT

An electronic system which limits exhaust emissions from an automobile engine by selectively retarding the point of firing the spark plugs at selected speeds during acceleration and at different speeds during deceleration; said system including a capacitive discharge ignition system which is responsive to an electronic system which will retard the point of firing the spark plugs a predetermined amount dependent upon the speed of the vehicle as above or below a predetermined speed. Said system also including an improved low cost tachometer for feeding to the system an analog output dependent upon the engine speed, which analog output is fed to a low rpm control level detector and a high rpm control level detector, and the outputs of said detectors are fed to a control logic which is connected to the vacuum advance of the engine to selectively disconnect the vacuum advance of the engine at certain speeds. Said electronic circuitry being connected such that the vacuum advance is disconnected and then reconnected at different speeds when the vehicle is operating in an acceleration mode than when the vehicle is operating in a deceleration mode.

37 Claims, 8 Drawing Figures

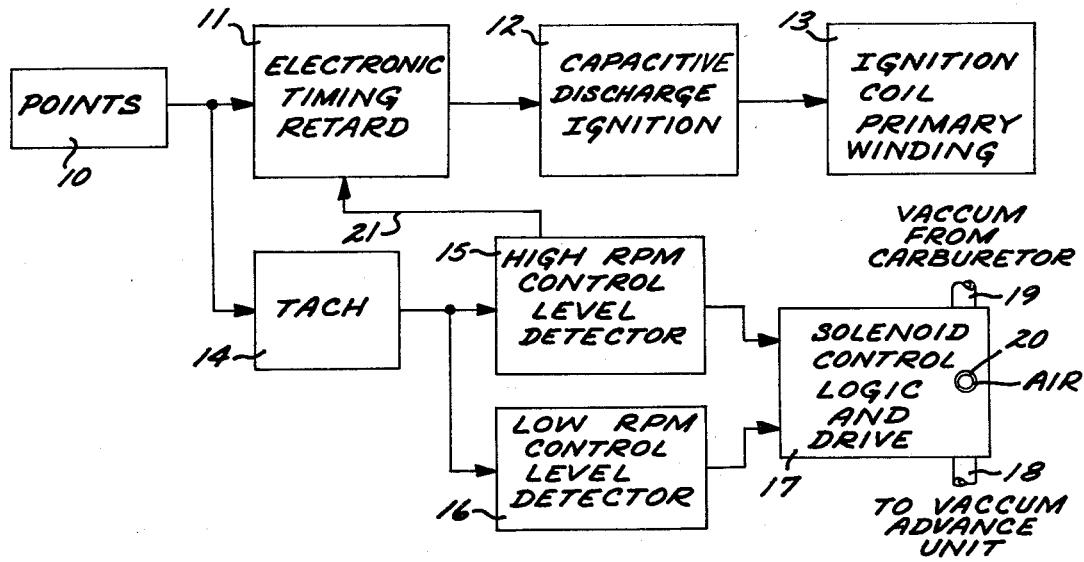
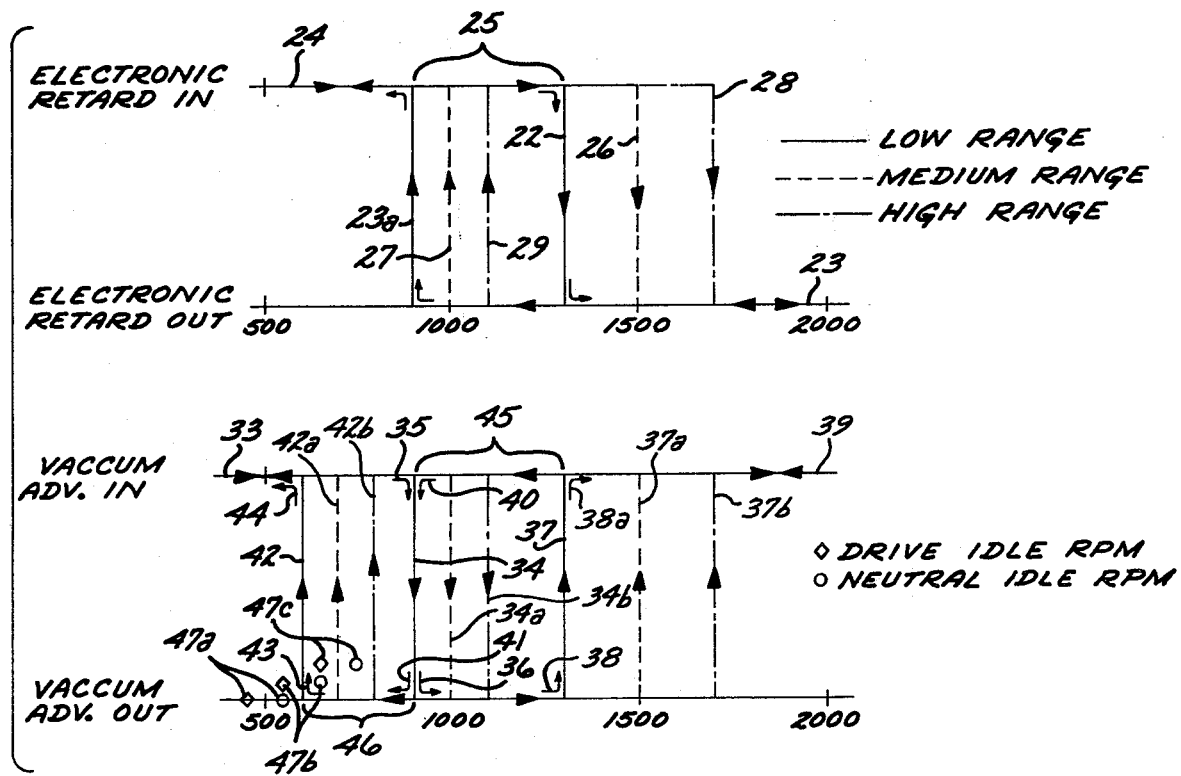

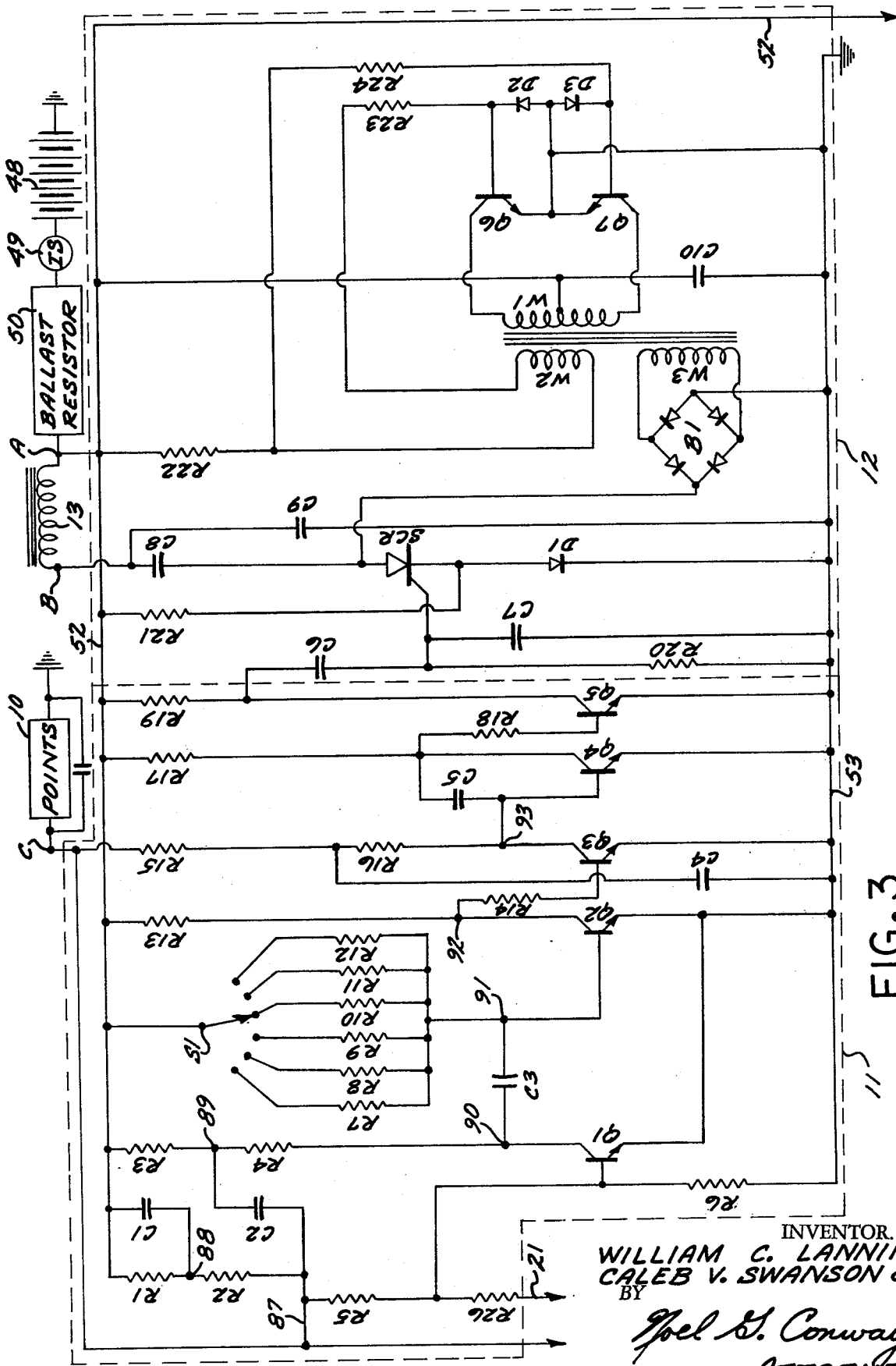

CONTROL SYSTEM FOR INTERNAL COMBUSTION ENGINE

PATENT APPLICATIONS

This application is a continuation of co-pending application Ser. No. 677,548, filed Apr. 16, 1976, now abandoned, which is a continuation of co-pending application Ser. No. 539,248, filed Jan. 7, 1975, now abandoned, which is a continuation of co-pending application Ser. No. 412,955, filed Nov. 5, 1973, now abandoned, which is a continuation of copending application Ser. No. 204,128, the parent application, filed Dec. 2, 1971, now abandoned.

BACKGROUND OF INVENTION

A significant contribution of atmospheric contamination from automobile engines is in the form of unburned hydrocarbons and carbon monoxide at speeds of 30 mph or lower, when the automobile engine is in the idle, cruise, acceleration and deceleration operating modes. Further, it has been found that significant contributions to atmospheric contamination by oxides of nitrogen are produced from automobile engines when operating in this just mentioned range, as well as, at high speed cruise modes. The contaminants discharged from automobile engines can be reduced by retarding the spark of the engine. That is, by causing each of the spark plugs to fire later (in relation to the time that the associated piston is at top dead center) than the time at which the manufacturers design the engine to have the spark plugs fire. The automobile manufacturers design the engines to have a maximum power output; however, said maximum output comes with the penalty of excessive emissions.

Merely retarding the spark will not solve the problems—if the spark is merely retarded—there will be a problem of potential overheating at idle speeds, and significant lss of fuel economy at the higher speeds. Accordingly, the spark must be retarded at only certain speed levels in order to minimize the exhaust emissions while avoiding significant degradation of fuel economy, as well as, avoiding overheating at idle speeds.

There is the additional problem that any units placed under the hood of an automobile engine must be capable of operating over a wide range of temperatures.

In addition to the problem of selectively retarding the spark at the desired times—in order to be economically feasible—the system must be of low cost manufacture, and must be adaptable to a wide range of cars. In addition, the system must be capable of being installed prpoerly by personnel of limited training, then work properly and reliably for long periods of time.

SUMMARY OF INVENTION

Briefly, systems of the present invention preferably include a high voltage capacitive discharge ignition system which will further insure that there will not be misfiring of spark plugs which are in poor condition.

The systems also include an electronic circuit which has the capability of being easily adjusted to retard the spark a selected amount when the electronic retard is "in". The amount that the spark is retarded depends upon the particular vehicle. A capability to retard in 2° increments between 2° and 13° has been found ample to cover the different vehicles upon which the present system might be used. The electronic retard system has the further capability that the retard is "in" during the acceleration mode of the vehicle until the vehicle reaches the speed of approximately 35 mph where the electronic retard is cut out. Yet, the system has the capability that the retard is not cut back in until the vehicle decelerates back down to approximately 15 mph. When the deceleration is from a speed slightly below 35 mph, it is desired that the electronic retard remain in during the deceleration down to and below 15 mph.

In systems of the present invention there is also a control to selectively deactivate the vacuum advance of the vehicle engine. This is accomplished through the use of a three-way solenoid operated valve which will selectively connect the vacuum from the carburetor or atmospheric air to the vacuum advance unit on the distributor. This solenoid operated valve is operated in response to the vehicle speed and the electronic circuitry controlling the valve has the capability of activating, or deactivating, the vacuum advance at different speeds when the vehicle is in the acceleration mode than when the vehicle is in the deceleration mode. This is because, as mentioned above, it is desired to have the spark retarded during the acceleration mode until the vehicle reaches approximately 35 mph when the deactivation of the vacuum advance is eliminated, and then—during deceleration—it is desired that the vacuum advance remain in operation until the vehicle has decelerated down to approximately 15 mph. Then, the vacuum advance is put out of operation until further deceleration of the engine to just above idle rpm. At idle rpm, the vacuum advance is again activated—thereby avoiding overheating.

Stating it in other words, the electronic retard portion of the present system, and the vacuum advance control portion of the present system each has a hysteresis in it to obtain the desirable feature of accommodating the difference in emissions in the deceleration mode when the vehicle is decelerating from high speed as compared to when the vehicle is decelerating from a lower speed (below 35 mph).

Primarily systems of the present invention are going to be installed on older vehicles (pre 1966). Accordingly, the cost of manufacture and installation, as well as, the reliability after installation is extremely important. Accordingly, another aspect of the present invention is that systems incorporating the present invention can be constructed at very low cost with relative low tolerance parts, and the systems are readily susceptible to incorporate low cost multi-component integrated circuits—thus reducing the cost of components and reducing assembly costs.

Systems of the present invention are installed in the engine compartment. In this area, the system is subjected to a wide range of temperatures, and temperatures which are very substantial (oftentimes up to 300° after the engine has been operating a long time on a hot day and then shut off). This places a particular requirement that the electronic circuitry operate reliably in spite of the wide range of operating temperature. Systems of the present invention can overcome this requirement while still meeting the low cost requirement. This is accomplished in part by conceiving the circuitry and selecting the components so that as an increase in temperature changes the operatng characteristics of some components, the other components are changed in such a way as to counteract the changes of the first mentioned components.

Another aspect of the present invention is that it lends itself to rapid installation—thereby reducing the cost to the consumer. The electronics and the solenoid valve can be all mounted in a single case, or housing, which is attached to the engine compartment side of a front wheel well. Extending from the case is merely a three wire lead which leads to the area of the ignition coil and the points where they can be rapidly connected to the two sides of the primary winding of the ignition coil, and to the output terminal of the points. Then, the rubber hose connecting the carburetor to the vacuum advance Unit can be cut and (using hose furnished with the present system) the solenoid valve in the housing can be connected into operative position. And, this rapid installation can be accomplished by personnel with little training.

As mentioned above, it is desired that the retard of the spark be eliminated when the vehicle reaches approximately 35 mph. In order to eliminate the expense of taking the speed from, e.g., the speedometer cable, systems of the present invention includes a tachometer which operates from engine speed. And, that tachometer includes an easily operated adjustment feature so that the tachometer can automatically correlate the engine speed to the vehicle speed. Of particular importance is that the tachometer, which has an analog output, not only produces an accurate output (despite the temperature variations mentioned above), but it has a low manufacturing cost.

Another aspect of the present invention is that the electronic circuitry is such that approximately a full ampere of current is passed through the points for a brief period of time, and then the current decreases to approximately one-tenth that amount. A full ampere of current for the brief period of time extends the life of the points by tending to clean the points each time they are opened and closed. And yet, there is not an excessive power drain which would be the case if the one ampere were continuously passing through the points all the time hat they were closed. This increases the life of the points and reduces the chances of misfires which would cause excessive undesired exhaust emissions.

Another aspect of the present invention is that there is located in the housing of the case a light which is on when the system is operating. This is important to the owner in order that he can determine that his system is operating. It is even more important in that it does furnish an easy means for a Highway Patrolman to make a quick visual Inspection to see if the system is operating.

With the foregoing in mind, it is a major object of this invention to provide an improved exhaust emission control system.

Another object of this invention is to provide an exhaust emission control system which has a low manufacturing cost, and yet can meet the operating temperature requirement encountered by the system.

It is still another object of this invention to provide an exhaust emission control system which includes improved capacitive discharge circuitry.

It is still a further object of this invention to provide an improved exhaust emission control system having an electronic control which selectively retards the spark at different speeds when the vehicle is in an acceleration mode than when the vehicle is in a deceleration mode.

A still further object of this invention is to provide an emission control system which can be fit on a wide variety of cars without modification.

It is still another object of this invention to provide in an automobile means for reducing the amount that the points the automobile ignition system tend to foul.

A further object of this invention is to provide a system for an automobile system which can selectively deactivate the vacuum advance of the engine.

A still futher object of this invention is to provide a system for an automobile engine which can selectively deactivate the vacuum advance of the automobile engine at one speed when the engine is accelerating, and at another speed when the engine is decelerating.

It is still another object of this invention to provide an automobile engine control system which can operate accurately over a wide range of temperatures to which it would be normally exposed in an automobile engine compartment.

Another object of this invention is to provide an improved tachometer suitable for use over a wide range of engine temperatures.

A further object of this invention is to provide an electronic spark retard system which is capable of retarding the spark a given number of degrees of crankshaft angle over a wide range of operating speeds.

It is still another object of this invention to provide an emission control system which can be rapidly installed on a wide variety of cars by technicians having little training.

It is still another object of this invention to provide an emission control system ahving an indication therein whereupon the visual inspection can be made to determine if the system is operating.

Other and further objects of this invention will become apparent in the detailed description below in connection with the attached drawings wherein:

DESCRIPTION OF DRAWINGS

FIG. 1 is a block diagram of a preferred system incorporating the present invention;

FIG. 2 is a pair of curves disclosing when the electronic retard and the vacuum advance are operative and nonoperative during the acceleration and the deceleration operating modes;

FIG. 3 is an electrical schematic of a portion of the electronics of a preferred embodiment of the present invention;

DETAILED DESCRIPTION OF PREFERRED SYSTEM

Figure 4:
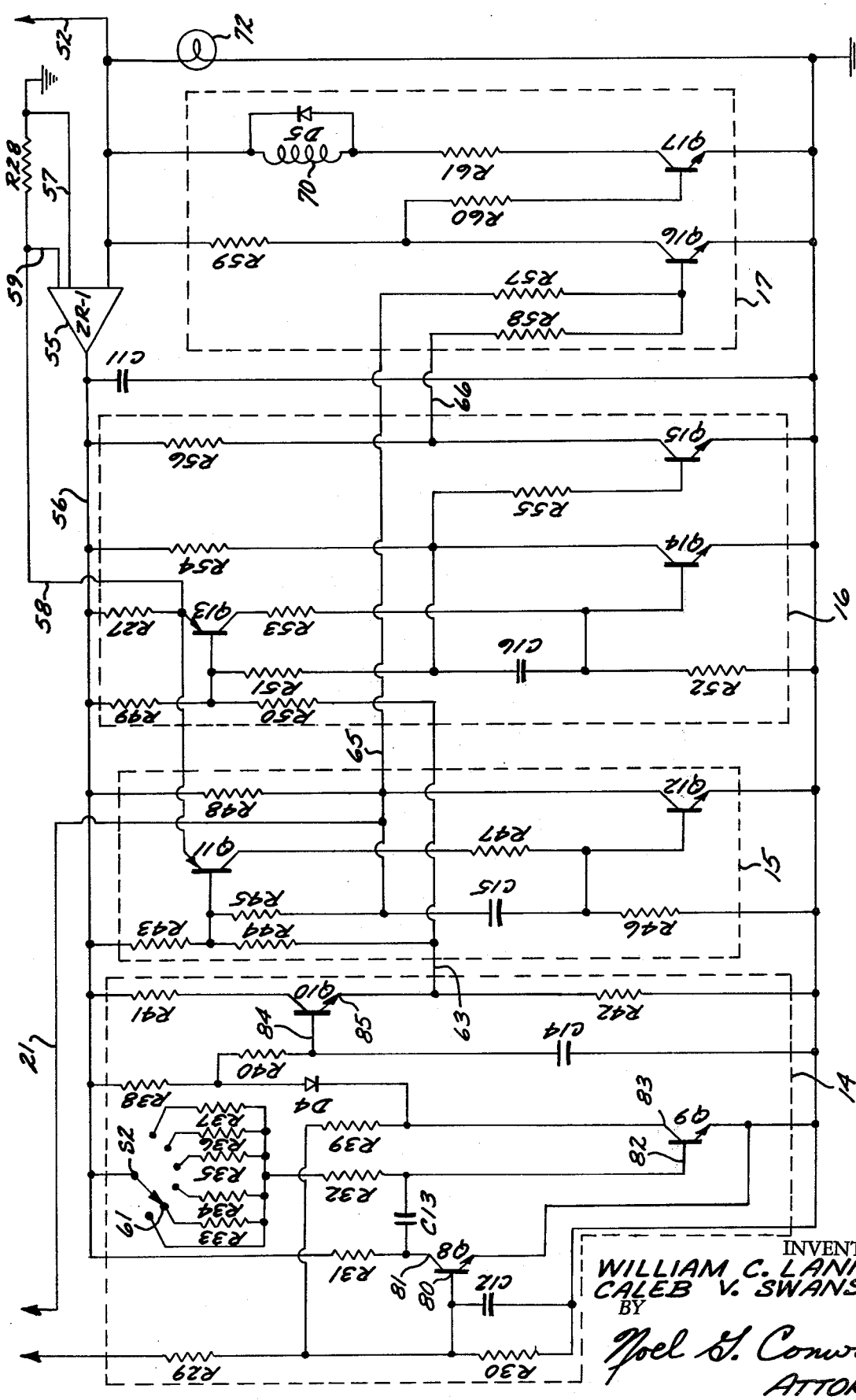
FIG. 4 is an electrical schematic of the other portion of the electronics of the system in FIG. 3.

Referring now to FIG. 1, the invention will be described in detail. There, the manner of operation of the system is shown in block diagram. The system is connected to points 10 of the automobile, and the opening and closing of those points will function to cause the system to operate in the desired manner. The points 10 are connected electrically to an electronic timing retard circuit 11, which in turn, has its output connected into a capacitive discharge ignition system 12. The capacitive discharge ignition system 12 has its output connected to the ignition coil primary winding 13 as will be described in further detail below.

The points 10 also have their output connected to a tachometer 14 which (as will be explained further below) has an analog output dependent upon the speed of the engine and the setting of the adjustments within the tachometer. The output of the tachometer 14 is connected to a high rpm control level detector 15 and also a low rpm control level detector 16. And, as can be seen, the output of the high rpm control level detector 15 and the low rpm control level detector 16 are connected into a solenoid control logic and drive 17 when it has a solenoid operated three-way valve therein. Said valve of the unit 17 will selectively connect the vacuum advance unit of the distributor (through hose 18) to either the vacuum of the carburetor (through hose 19) or to atmospheric air through an opening 20 (in which case the vacuum advance is disengaged).

The present system cannot merely use one set relation between the speed of the engine and the operation of the vehicle. More particularly, it is desired that the system do certain things at certain speeds. However, not all cars have the same engine speed at, e.g., 35 mph. This is because of the ratio of speed reduction (if any) through the transmission and also the ratio of the rear end of the vehicle. Furthermore, there is the problem that an 8 cylinder car opens and closes its points four times each revolution of the crankshaft while a 6 cylinder car opens and closes its points only three times during such revolution.

The problem of the varying transmission ratios and rear-end ratios and varying number of cylinders is accommodated in the present system by electronics thereof as will be described further below. At this time, suffice it to say that the system has an easily accomplished adjustment.

It has been found that approximately three ranges of operation can accommodate essentially all 8 cylinder automobiles of the 1955 to 1965 model years, and three different operating ranges will accommodate essentially all of the 6 cylinder cars for these years.

Referring now to FIG. 2, it is seen that the system has a low range, medium range, and high range. In the low range, the vehicle will reach selected operating speeds when the automobile engine is operating at a lower speed than in the case of the medium range vehicle drive gear train or the high range drive gear train. This can be seen better by way of illustration. It is to be understood that the following is merely the preferred operation and the system could be easily adjusted to operate so as to shift at other engine speeds.

Preferably, the electronic retard is desired to cut out (in the acceleration mode) when the vehicle is traveling at approximately 35 mph. And then, when the vehicle is decelerating from a speed higher than 35 mph, it is desired that the electronic retard cut back in at approximately 15 mph.

In FIG. 2, there is illustrated that the engine of a low range vehicle is rotating at approximately 1,300 rpm when the vehicle is going at approximately 35 mph and the electronic retard is deactivated when the car is accelerated to that speed as indicated by line 22. During further acceleration of the car, the electronic retard remains deactivated as indicated along line 23. As the car decelerates from above approximately 35 mph, the electronic retard remains deactivated until the engine rpm reaches approximately 900 rpm at which time the electronic retard is reactivated as indicated by line 23a. And during the further deceleration, the electronic retard remains activated as indicated by line 24. As indicated by brace 25, there is a hysteresis between 900 rpm and 1,300 rpm. That is, if the vehicle is only accelerated to a speed where the engine is rotating at approximately 1,200 rpm and then decelerated, the electronic retard is never deactivated. Conversely, if the vehicle is traveling at over 35 mph (and the electronic retard is deactivated), and is then decelerated to approximately 20 mph, and then accelerated again, the electronic retard remains deactivated.

With a medium range vehicle, the engine is rotating at approximately 1,500 rpm at 35 mph and approximately 1,000 rpm at 15 mph. In this case, during the acceleration mode, the electronic retard is deactivated at 1,500 rpm as indicated by dashed line 26. During the deceleration mode from above 35 mph, the electronic retard is reactivated at approximately 1,000 rpm as indicated by dashed line 27.

With a high range vehicle, the engine is rotating at approximately 1,700 rpm at 35 mph and 1,100 rpm at 15 mph. In such case, during the acceleration mode, the electronic retard is deactivated at approximately 1,700 rpm as indicated by center line 28. And, during deceleration from above 35 mph, the electronic retard is reactivated at approximately 1,100 rpm as indicated by center line 29.

In FIG. 2, there is also illustrated the manner in which the vacuum advance is activated and deactivated. When the engine is idle, the vacuum advance is activated as indicated by line 33. With a low range vehicle, the vacuum advance is deactivated at approximately 15 mph, as indicated by line 34 and arrow 35. During further acceleration of the vehicle, the vacuum advance remains deactivated, as indicated by arrow 36, until the vehicle reaches approximately 35 mph when the vacuum advance is reactivated as indicated by line 37 and arrow 38. During further acceleration of the vehicle, the vacuum advance remains activated (as indicated by arrow 38a) and line 39. During deceleration from above approximately 35 mph, the vacuum advance remains activated until the vehicle reaches approximately 15 mph where—as indicated by arrow 40—the vacuum advance is deactivated. The speed is preferably similar to the speed that the vacuum advance is deactivated in acceleration but is not the same. Further deceleration—as indicated by arrow 41—keeps the vacuum advance in the deactivated condition until the vehicle reaches a speed of approximately 600 rpm. At this speed, the vacuum advance is reactivated as indicated by line 42 and arrow 43. Then, during further reduction of engine speed, the vacuum advance remains activated as indicated by arrow 44. With this system, it can be seen that there is a hysteresis indicated by brace 45 between the speed at which the vacuum advance is reactivated during acceleration, and the speed that the vacuum advance is deactivated during deceleration. Similarly, there is a hysteresis indicated by brace 46 between the speed at which the vacuum advance is deactivated during acceleration and the engine speed at which the vacuum advance is reactivated during deceleration.

With a low range vehicle, the idle rpm of the engine in drive, or neutral, as indicated by the square and circle 47a are each below the engine speed at which the vacuum advance is reactivated in order to eliminate overheating when the engine is idling.

With a medium range vehicle in the acceleration mode, the vacuum advance is deactivated at approximately 1,000 rpm, as indicated by dashed line 34a, and then reactivated at approximately 1,500 rpm, as indicated by dashed line 37a. Then, during deceleration from above 35 mph, the vacuum advance is deactivated at approximately 1,000 rpm, and then reactivated at approximately 700 rpm, as indicated by dashed line 42a. As indicated by the square and circle 47b, the engine idle rpm in drive and neutral are each lower than the rpm represented by line 42a.

With a high range vehicle in the acceleration mode, the vacuum advance is disconnected at approximately 1,100 rpm, as indicated by the center line 34b, and then reactivated at approximately 1,700 rpm, as indicated by center line 37b. Then, during the deceleration mode from above 35 mph, the vacuum advance is not deactivated until the vehicle reaches approximately 15 mph (see line 34b). And, further deceleration will cause the vacuum advance to be reactivated at approximately 800 rpm, as indicated by center line 42b. Here again, the engine idle rpm in drive or neutral is below the engine speed at which the vacuum advance is reactivated as indicated by the square and circle 47c.

ELECTRONIC DELAY AND CAPACITIVE DISCHARGE CIRCUITRY

Referring now to FIGS. 3 to 7, a preferred embodiment of the electronic circuitry of a system incorporating the present invention will now be described. In FIG. 3, it can be seen that the car's battery 48 is connected to ground and ignition switch 49. The ignition switch 49 is connected through a ballast resistor 50 to one side of the ignition coil primary winding 13.

As mentioned previously, and will be described further below, the present system is electrically connected to the engine at the two sides of the ignition coil primary winding 13, as indicated at junctions A and B. In addition, the system is connected to the non-grounded side of the points 10 as indicated at junction C. Furthermore, the system is grounded to the vehicle chassis. Because of this, and other aspects pointed out herein, the system can be quickly installed by persons of limited training.

As mentioned previously, the present system has the advantage that it causes a momentary surge of current across the points as they close, and then, the current drops to a very minor amount to minimize the drain on the battery 48. To this end, there is provided a resistor R1 and capacitor C1, each of which has its upper sides (as seen in FIG. 3) connected to power line, or B+ line, 52 which is connected to the battery 48 when the ignition switch 49 is closed. Additionally, there is provided a resistor R2 which has a value of approximately 10% of that of resistor R1. With this system, when the points 10 are open, the capacitor C1 is discharged. Then, when the points are closed, there is a large surge of current while the capacitor C1 is being charged through the lesser value resistor R2. After the capacitor C1 is charged, any further current must pass through the resistors R1 and R2. With the resistors R1 and R2 and the capacitor C1 at the value stated below, there will be a large current of approximately 1 amp with a time constant of decay to 0.1 amps of approximately 22 microseconds while the capacitor C1 is being charged.

For a function to be described further below, the electronic timing retard 11 also includes a resistor R3 connected at one end to B+ line 52 with its other end connected through substantially larger resistor R4 to the collector of NPN transistor Q1. As can be seen, the emitter of the transistor Q1 is connected to ground line 53. The base of the transistor Q1 is connected to the common side of series connected resistors R5 and R6. And, for a purpose to be described, a capacitor C2 is connected between the common ends of series connected resistors R3 and R4 and the points 10.

For purposes of accommodating varying timing retard requirements of the many engine configurations, there is provided a switch S1 having six positions with a resistor R7 through R12 connected to each respective position. The values of the resistors are set forth below; however, at this point, suffice it to say that, preferably, the amount of electronic retard can be varied in 2° increments from 2° delay to 12° delay, dependent upon which of the six positions the switch S1 is in. With the switch S1 in position where the B+ line 52 is connected through a lesser resistor, there is less delay, and when the switch S1 is connected to a higher resistor, there is more delay. The lower ends of the resistors R7 to R12 are connected to the base of NPN transistor Q2 and one side of capacitor C3 (the other side of which is connected to the collector of the transistor Q1). The transistor Q2 has its collector connected to B+ line 52 through resistor R13, while said transistor's emitter is connected to the ground line 53. And, as can be noted, a capacitor C4 has one side connected to the common ends of the resistors R15 and R16, and one side connected to ground.

The collector of the transistor Q3 is connected to the base of NPN transistor Q4. Said transistor Q4 has its collector connected to B+ line 52 through a resistor R17 while its emitter is tied directly to ground. Capacitor C5 has one side connected to the collector of the transistor Q4, and the other side tied to the base of the transistor Q4 and the collector of the transistor Q3.

The collector of the transistor Q4 is connected to the base of NPN transistor Q5 through resistor R18. And, as can be seen, the transistor Q5 has its emitter tied directly to ground, and its collector tied to B+ line 52 through resistor R19.

The collector of the transistor Q5 is connected through capacitor C6 to the gate of silicon control rectifier SCR. It will also be noted that the control terminal of the rectifier SCR is connected to ground through capacitor C7 and connected to ground, additionally, through resistor R20.

As illustrated, the rectifier SCR has its anode connected to one end of the ignition coil primary winding 13 through capacitor C8. And, the cathode of the rectifier SCR is connected through diode D1 to ground. B+ voltage is supplied through resistor R21 to the cathode side of the rectifier SCR.

For a purpose to be described, a capacitor C9 has one side connected to the side of the capacitor C8 which is connected to the primary winding 13, and has its other side connected to ground.

High voltage is supplied to the anode side of the rectifier SCR from a saturating core oscillator which will now be described. As can be seen, NPN transistors Q6 and Q7 have their emitters tied together and to ground. Each of the emitters of each of these respective transistors Q6 and Q7 are connected to the bases of the respective transistors by diodes D2 and D3, respectively. Primary winding W1 of the oscillator has its two ends connected to the collectors of the transistors Q6 and Q7, respectively, and in addition, said primary winding is center-tapped (with, preferably, seven turns on either side) to B+ line 52 directly, and is connected to ground through capacitor C10. In order to keep the oscillation going, there is a base winding W2 (having, e.g., four turns), which has one side connected to B+ line 52 through resistor R22. The two respective sides of the base winding W2 are connected to the bases of the transistors Q6 and Q7 through resistors R23 and R24, respectively (which resistors function to limit the current flow in this portion of the oscillator).

In the particular system shown, it is desired to supply approximately 335 volts to the anode side of the rectifier SCR. Therefore, there is a ratio of approximately 28 to 1 between secondary winding W3 of the oscillator in each half of the primary winding W1. For example, if each half of the primary winding W1 had seven turns, the secondary winding W3 might have one hundred ninety six turns. The high voltage AC output of the secondary winding W3 is rectified through full wave bridge rectifier B1 so that DC power at approximately 336 volts is supplied to the anode side of the rectifier SCR. The saturating core oscillator shown has the advantage that it is cheap and rugged, and most particularly, is not subject to change as a result of the variations in temperature experienced under the hood of most cars. Said oscillator will oscillate at approximately 10,000 Hz.

TACHOMETER, HIGH AND LOW RPM CONTROL LEVEL DETECTOR CIRCUITRY

Referring now to FIG. 4, the details of the tachometer 14, the high rpm control level detector 15, and the low rpm control level detector 16 will be described in further detail.

There is provided an integrated circuit voltage regulator 55 which will generate a regulated voltage along regulated voltage line 56 of (preferably) approximately 6.2 volts. The integrated circuit regulator 55 is connected to ground through line 57, and is also connected to feedback line 58 through line 59. As can be seen, the feedback line 58 is biased above ground through resistor R28. It will also be noted that line 56 is connected to feedback line 58 through resistor R27. For purposes of filtering surges, the line 56 is also connected to ground through capacitor C11. The voltage regulator 55 is conventional and will not be described in further detail.

The signal from the points of the engine are fed into the tachometer 14 through limiting resistor R29. The use of the signal will be described further below. It will also be noted that the lower side of the resistor R29 (as seen in FIG. 4) is connected through resistor R30 to ground, and to the base of NPN transistor Q8. Filter capacitor C12 is connected across the resistor R30 and between the base of the transistor Q8 and ground to filter out noise. This is important as the transistor Q8 will turn on more easily as its temperature is increased. It will also be noted that the collector of the transistor Q8 is connected to the regulated voltage line 56 through resistor R31, while the emitter of the transistor Q8 is connected to ground.

As mentioned previously, it is desired that the system be capable of handling 6 cylinder engines, as well as, 8 cylinder engines. And further, there is need that the system have a low range, medium range, and high range capability for each of these types of engine. To this end, there is an NPN transistor Q9 having its base connected to a switch S2 through a main resistor R32. The switch S2 can be positioned at any one of six positions in order to connect the regulated voltage to the resistor R32 (thence to transistor Q9) directly or through any one of five adjustment resistors R33 to R37. In FIG. 4, the switch arm of the switch S2 is connected to contact 61 by way of example.

Capacitor C13 is connected between the collector of the transistor Q8 and the base of the transistor Q9 for a purpose which will be described below.

Regulated voltage is fed from line 56 through resistor R38 and diode D4 to the collector of the transistor Q9. Said collector of the transistor Q9 is also connected to the signal from the points 10 through resistor R39 and resistor R29. Also, as can be seen, the collector of the transistor Q9 is connected (in one direction only because of the diode D4) to the base of NPN transistor Q10 through resistor R40. Said base of the transistor Q10 is also connected to ground through integrating capacitor C14.

The transistor Q10 has its collector connected to the regulated voltage through limiting resistor R41 while its emitter is connected to ground through resistor R42.

The operation of the tachometer 14 will be described further below. Suffice it now to say that the output of the tachometer 14 is fed from the tachometer through tachometer output line 63 to the high rpm control level detector 15 and the low rpm control level detector 16.

The high rpm control level detector 15 includes a PNP transistor Q11 which has its base connected to the regulated voltage line 56 through resistor R43, and to the tachometer output line 63 through resistor R44. The base of the transistor Q11 is also connected to high rpm control level detector output line 65 through limiting resistor R45. The base of NPN transistor Q12 is also connected to high rpm control level detector output line 65 through capacitor C15, and to ground through resistor R46, and to the collector of the transistor Q11 through a resistor R47. It will also be noted that the collector of the transistor Q12 is connected to high rpm control level detector output line 65, and thence to regulated voltage line 56 through resistor R48. The manner of operation of the high rpm control level detector will be described further below; however, it should be pointed out here that line 21 is connected to the output line 65 in order to feed to the electronic retard 11 the selected signals at the desired selected times in the operation of the vehicle.

The low rpm control level detector 16 includes a PNP transistor Q13 having its base biased from the regulated voltage line 56 through the use of a resistor R49. Said base of the transistor Q13 is also connected through resistor R50 to the tachometer output line 63, and thence to ground through the resistor R42.

The transistor Q13 also has its base connected through a resistor R51, capacitor C16 and resistor R52 in series to ground. The collector of the transistor Q13 is connected through a resistor R53 to the base of NPN transistor Q14 (which has its emitter connected to ground). And, as can be seen, the common side of the capacitor C16 and the resistor R52 are also connected to the base of the transistor Q14. The collector of the transistor Q14 is connected to regulated voltage through a resistor R54, and is connected to the base of NPN transistor Q15 through a resistor R55. The transistor Q15 has its collector connected to regulated voltage line 56 through a limiting resistor R56, and has its emitter connected directly to ground. As can be seen, low rpm control level detector output line 66 is also connected to the collector of the transistor Q15.

SOLENOID CONTROL LOGIC AND DRIVE CIRCUITRY

The solenoid control logic and drive 17 for activating and deactivating the vacuum advance at the desired times will now be described. As can be seen, the solenoid control logic and drive 17 includes an NPN transistor Q16 having its base connected to high rpm control level detector output line 65 through a limiting resistor R57 and connected to low rpm control level detector output line 66 through a limiting resistor R58. Transistor Q16 has its emitter connected directly to ground. The collector of the transistor Q16 is connected to B+ line 52 through a limiting resistor R59, and is connected to the base of NPN transistor Q17 through a limiting resistor R60. The emitter of the transistor Q17 is connected to ground, while its collector is connected to B+ line 52 through limiting resistor R61 and solenoid coil 70 of a solenoid operated 3-way valve. Diode D5 serves to suppress arcing.

It is desired that a Highway Patrolman easily determine whether or not the system is connected and operating. To this end, there is provided a small lamp 72 connected between B+ line 52 and ground. Therefore, whenever the system is operating, the lamp will be lit.

It has been found that resistors of the following values (in ohms) are satisfctory.

| R1, | 100 |   | R32, | 8.2 | K |
|---|---|---|---|---|---|
| R2, | 10 |   | R33, | 2.7 | K |
| R3, | 2.2 | K | R34, | 4.7 | K |
| R4, | 47 | K | R35, | 6.8 | K |
| R5, | 10 | K | R36, | 8.2 | K |
| R6, | 2.2 | K | R37, | 10 | K |
| R7, | 2.7 | K | R38, | 470 |   |
| R8, | 4.7 | K | R39, | 6.8 | K |
| R9, | 6.8 | K | R40, | 4.7 | K |
| R10, | 8.2 | K | R41, | 150 |   |
| R11, | 10 | K | R42, | 1 | K |
| R12, | 12 | K | R43, | 33 | K |
| R13, | 1 | K | R44, | 33 | K |
| R14, | 15 | K |   |   |   |
| R15, | 4.7 | K | R45, | 150 | K |
| R16, | 1 | K | R46, | 10 | K |
| R17, | 1 | K | R47, | 10 | K |
| R18, | 1 | K | R48, | 1 | K |
| R19, | 150 |   | R49, | 30 | K |
| R20, | 150 |   | R50, | 33 | K |
| R21, | 1 | K | R51, | 470 | K |
| R22, | 470 |   | R52, | 10 | K |
| R23, | 7.5 |   | R53, | 4.7 | K |
| R24, | 7.5 |   | R54, | 1 | K |
| R26, | 6.8 | 250 | R55, | 15 | K |
| R27, | 150 |   | R56, | 1 | K |
| R28, | 330 |   | R57, | 6.8 | K |
| R29, | 10 | K | R58, | 6.8 | K |
| R30, | 4.7 | K | R59, | 220 |   |
| R31, | 470 |   | R60, | 470 |   |
|   |   |   | R61, | 20 |   |

It has been found that capacitors of the following values (in microfarads unless otherwise indicated) are satisfactory.

C1, 2.2
C2, 0.47
C3, 2.2
C4, 0.22
C5, 100 picofarads
C6, 0.22
C7, 0.1
C8, 1.5
C9, 0.047
C10, 100
C11, 22
C12, 0.1
C13, 0.47
C14, 39
C15, 0.1
C16, 0.1

OPERATION OF TACHOMETER

Figure 5:
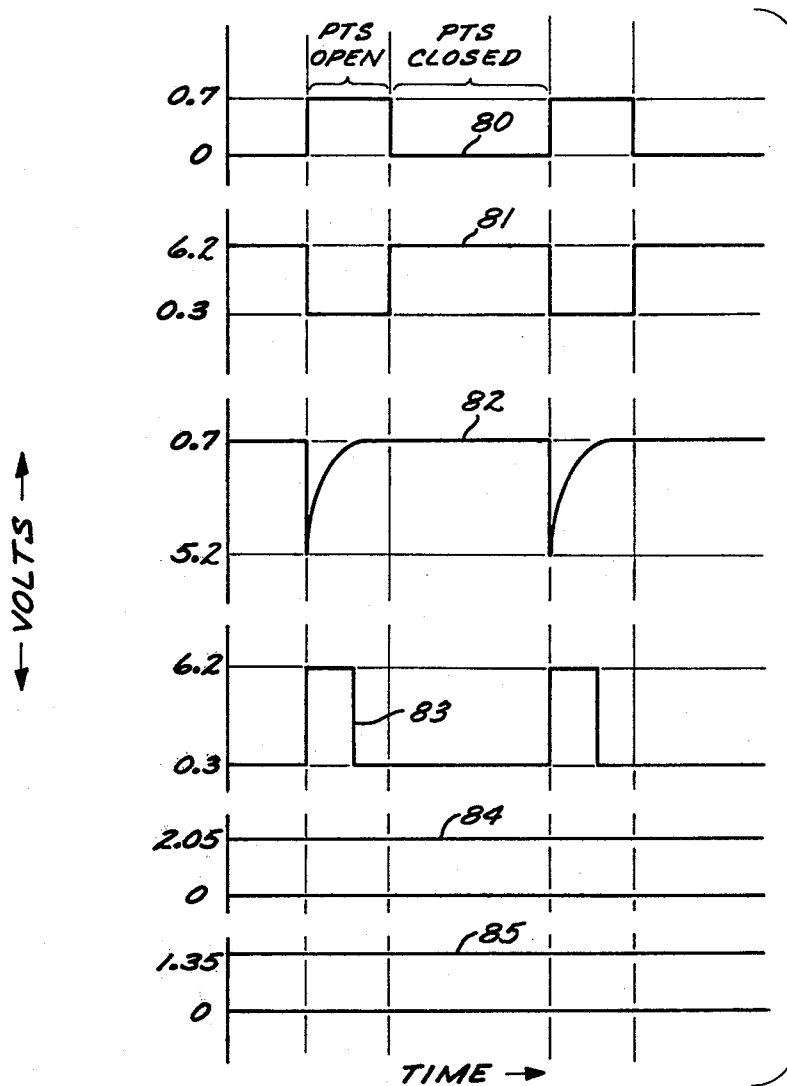
FIG. 5 is a set of curves disclosing the voltage at various points in the tachometer of the system.
Figure 6:
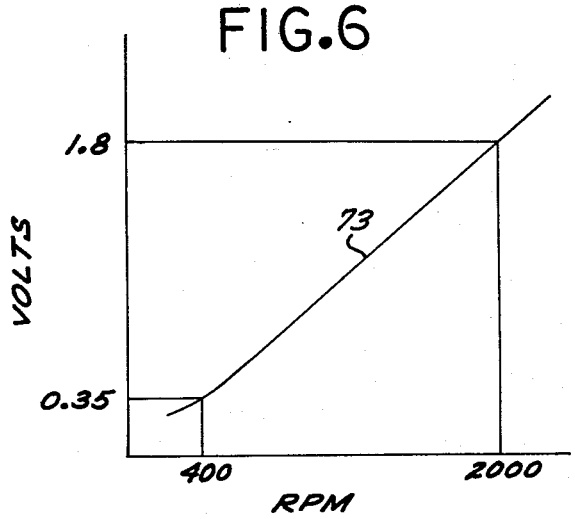
FIG. 6 is a curve illustrating the anlog output of the tachometer of the system.

Referring now to FIGS. 4, 5, and 6, the operation of the tachometer 14 will be described in further detail. As illustrated in FIG. 6 by line 73, there is an analog voltage output on tachometer output line 63 which is a function of engine rpm. And, the present system has essentially a linear function output between 400 rpm and over 2,000 rpm. Actually, the linear function output exists up to considerably higher rpm; however, the range which the system is primarily interested in is only to approximately 2,000 rpm.

In FIG. 5, there is shown a series of lines 80 to 85 which demonstrate the voltage changes and states at various points in the tachometer 14. As can be seen by comparison of FIGS. 4 and 5, line 80 is the voltage at point 80 at the base of the transistor Q8, while line 81 is the voltage at point 81 at the collector of the transistor Q8 on the input side of the capacitor C13; line 82 is the voltage at point 82 at the base of the transistor Q9 (and therefore, the right side of the capacitor C13; line 83 is the voltage at point 83 at the collector of transistor Q9; line 84 is the voltage at point 84 at the base of the tranusistor Q10; and line 85 is the voltage at point 85 at the emitter of the transistor Q10 (and therefore, the output line 63). In FIG. 5, the curves have been drawn using a typical 8 cylinder engine running at approximately 1,500 rpm.

In the following description, voltage values will be given to various points of the circuit in the operation. It is to be understood the values at the points vary at different operating conditions, eg., different operating temperatures. Accordingly, these values are only approximate for a nominal average operating temperature and are merely used in order to facilitate an understanding of the manner in which the circuit operates, and they are not to be interpreted as being absolutely correct.

In FIG. 5, line 80 discloses how the voltage at the base of the transistor Q8 varies between approximately 0 to 0.7 volts as the points are closed and opened respectively.

When the points 10 are closed, the transistor Q8 is off, and the transistor Q9 is on because of the forward bias at its base received through the particular leg of the switch S2 and the resistor R32. At that time, the collector of the transistor Q9 at point 83 is at approximate 0.3 volts the normal drop between the collector and emitter of the transistor when it is saturated.

When the points 10 open, voltage potential from B+ line 52 biases the base of the transistor Q8 forward, turning the transistor on to saturation. When the transistor Q8 is saturated, this causes the point 81 (and therefore, the input side of the capacitor C13) to drop to approximately 0.3 volts. As indicated by line 82, this will cause the right side of the capacitor C13 and the base of the transistor Q9 to drop to approximately 5.2 volts. Then, as indicated by line 82, current through the switch S2 and resistor R33 will discharge the output side of the capacitor C13. As is obvious, the amount of resistance in the circuit of the switch S2 and the resistor R32 determines how long it is going to take for the point 82 to return up to its 0.7 volt level where the transistor Q9 is fully saturated again. As shown by the line 83, the collector of the transistor Q9 is at regulated voltage until the transistor is turned back on.

It is important to note that, through resistor R39, the collector of the transistor Q9 is connected to the base of the transistor Q8. This is to give the tachometer extra range. More particularly, in the event that the speed of the engine is so fast that the points 10 open and close between the transistor Q9 is turned back on, the collector voltage of the transistor Q9 will hold the base of the transistor Q8 biased forward enough so that the transistor Q8 will remain on until the transistor Q9 is turned on, as determined by the time constant established by the combination of the capacitor C13, the resistor R32 and the particular resistance through the switch S2.

The diode D4 has a drop across it of approximately 0.4 volts. Therefore, the voltage on the anode side of the diode D4 will vary between approximately 0.7 volts and 6.2 volts when the transistor Q9 is turned on and turned off respectively. By virtue of the resistor R40 and the capacitor C14, this signal is integrated at point 84 and gives an average voltage of approximately 2.05 volts (in the present example) as indicated by line 84 in FIG. 5. In order to reduce the circuit output impedance, the output line 63 is connected to the emitter of the transistor so as to have an emitter follower circuit. There is approximately a 0.7 voltage drop across the junction between the base and emitter of the transistor Q10. Therefore, line 85 is shown as being approximately 1.35 volts.

As can be seen by the circuit described, there is a certain charge of electricity imposed upon the base of the transistor Q10 everytime the points open. Therefore, the integrated value at the point 84 will rise as the speed of the engine increases, thus giving at point 85 the analog output which is a function of engine speed.

In the case where there is a high ratio between an 8 cylinder engine and the wheels, there would be a larger number of times that the points open and close per minute for a specific road speed (i.e., 20 mph) than would be the case if the 8 cylinder engine had a lower ratio between it and the rear wheels. As mentioned above, this can be accommodated by positioning the switch S2 in accordance with what type of engine and ratio is involved in the car. The switch S2 is set when the system is installed on the car.

For example, if the system were used on an 8 cylinder engine with a high ratio, the switch S2 would be connected to the contact which has no resistor in the circuit other than the base resistor R32. This would minimize the charging time, and shorten the width of the pulse at the point 83. Shortening the width of the pulse seen on the line 83 would have the effect of reducing the analog voltage output at tachometer output line 63. However, this is offset by the fact that there are an increased number of pulses for a given speed. On the other hand, if the system were to be used in a 6 cylinder car with a low ratio, the switch S2 would be moved so that the base of the transistor Q9 would have to be charged through resistor R37 and resistor R32. This would increase the amount of time of recharging, and thereby widen the pulse seen on line 83. By proper adjustment of the switch S2 to the particular number of cylinders and ratio, the analog output at line 63 can be made to be the same at 20 mph regardless of which type of engine and ratio is involved.

As mentioned previously, the present system must operate over a wide range of temperatures without creating errors. To this end, the resistor R30 and capacitor C12 are connected between the base of the transistor Q8 and ground in order to filter out noise. At increased temperatures, the transistor Q8 tends to turn on more easily. That is, at the increased temperatures it takes less forward bias of the base relative to the emitter to turn on the transistor. Therefore, there is a greater chance of a spurious signal turning on the transistor at the wrong time.

As temperature increases, the voltage drop between the base and emitter of the transistor Q9 also decreases. This would have the effect of raising the level of line 85 in comparison to line 84 in FIG. 5. Therefore, increasing temperature tends to increase the analog voltage output on the line 63 at a given engine speed. However, the present tachometer 14 partially compensates for this change resulting from increased temperature in the following manner. The diode D4 has been included in the circuit. The voltage drop across the diode D4 tends to drop as voltage increases. Further, there is a drop in the voltage across the transistor Q9 when it was turned on as temperature increases.

The resistor R30 also puts a current drain on the base of the transistor Q8 so as to make sure that the base does not shift enough to spuriously turn on the transistor Q8 at high temperatures where the saturation emitter-base voltage is very much lower.

OPERATION OF HIGH RPM CONTROL LEVEL DETECTOR

The output of the tachometer 14 is fed to the base of the transistor Q11. At the low speeds, the transistor Q11 is on, and the transistor Q12 is on. Then, when the analog voltage on the line 63 increases sufficiently, it will turn the transistor Q11 off and this turns the transistor Q12 off. When the transistor Q12 turns off, high rpm control level detector output line 65 goes to regulated line voltage of approximately 6.2 volts which is supplied to the electronic retard circuit 11 and the solenoid control logic and drive 17 to operate in a manner described above and below.

As mentioned previously, it is desired that there be a hysteresis in the operation of the high rpm control level detector. This is because of the feedback to the base of the transistor Q11 through resistor R45. During the acceleration of the vehicle, the transistors Q11 and Q12 are on as previously mentioned. Because of this, current is being drained from the base of the transistor Q11 through the resistor R45 and through the transistor Q12 to ground. The output line 65 in this condition is at about 0.3 volts which is the saturation of voltage across the transistor Q13. However, once the transistors Q11 and Q12 have turned off (as a result of the speed of the vehicle causing a sufficiently high voltage on tachometer output line 63) the output line 65 moves from approximately 0.3 volts to approximately 6.2 volts, and tends to bias the transistor Q11 more off. Because of this, the voltage on the tachometer output line 63 must become somewhat lower before the transistor Q11 can turn itself back on. When the voltage on line 63 becomes sufficiently low to turn on transistor Q11 (and thereby turn on the transistor Q12) the decrease in voltage on the collector of the transistor Q12 from approximately 6.2 volts to 0.3 volts tends to aid in turning on the transistor Q11 (positive feedback) thereby effecting the desired hysteresis function and also providing circuit stability by reducing switching threshold uncertainty.

As mentioned above, the effect of increased temperature on the diode D4 and the transistor Q9 partially offsets the effect of increased temperature on the transistor Q10. this reduction of the voltage drop across the base to emitter junction of the transistor Q10 is further offset by the arrangement of the transistor Q11. More particularly, the transistor Q11 was selected to be a PNP type. And, the way the transistor Q11 is connected in the circuit, the potential on its base will have to be higher in relation to the emitter potential in order to turn off the transistor as the temperature of the transistor is increased. Thereby, the fact that the potential of the tachometer output line 63 at a given speed tends to increase with temperature is further offset by the fact that the potential of the base of the transistor Q11 must be somewhat higher as the temperature is increased in order to turn the transistor off. It will also be noted that the transistor Q12 has a filter by means of the capacitor C15 which will offset any spurious spikes to the transistor's base. If for example, a momentary positive noise spike were imposed on the base of the transistor Q12 and it turned on, the collector potential would drop and this drop in collector potential would be fed back to the base of the transistor thus turning the transistor back off.

OPERATION OF LOW RPM CONTROL LEVEL DETECTOR

The tachometer output line 63 also leads to the base of the transistor Q13 of the low rpm control level detector 16. The transistors Q13 and Q14 are on. Then, when the vehicle reaches a speed where the vacuum advance is to be cut out, the voltage on the output line 63 turns transistor Q13 off which in turn turns the transistor Q14 off. Turning off the transistor Q14 raises the potential of the base of the transistor Q15 turning it on. When the transistor Q15 is turned on, the voltage on the output line 66 drops from approximately 6.2 volts to approximately a 0.3 volt. And then, when the transistor Q15 is turned back on, said line 66 drops back down to approximately 0.3 volts. The manner in which the output on the line 66 is used by the solenoid control logic and drive 17 will be described further below.

As in the case of the high rpm control level detector 15, the low rpm control level detector 16 has a hysteresis. This is accomplished by the feedback through the resistor R51 (which is the counterpart of resistor R45 in the high rpm control level detector 15). The negative hysteresis is approximately 300 rpm as indicated above.

There will also be noted that there is provided a capacitor C16 which operates as a noise filter by being connected to the base and collector of the transistor Q14.

It will be noted that the transistor Q13 compensates for temperature variations in the same manner as the transistor Q11 as explained above. Further, the capacitor C16 presents a feedback loop between the collector and base of the transistor Q14 in order to eliminate the adverse effect of spurious spikes.

OPERATION OF SOLENOID CONTROL LOGIC AND DRIVE

In the solenoid control logic and drive 17, there are provided the two transistors Q16 and Q17 which are connected between B+ line 52 and ground. When the transistor Q16 is on, the transistor Q17 is off. In this condition, the coil 70 of the valve is not actuated and the vacuum advance is in, or activated. When the transistor Q16 is turned off, the transistor Q17 is turned on and the coil 70 actuates the valve to connect the vacuum advance to atmospheric air — thus effectively deactivating the vacuum advance.

At idle speeds, the transistor Q15 is off. Therefore, the transistor Q16 is on, and the transistor Q17 is off (and therefore, the vacuum advance is in). As the engine speeds up, through the transistors Q13 and Q14 being turned off, the transistor Q15 turns on — thus turning off the transistor Q16 — which in turn activates the solenoid valve by turning the transistor Q17 on.

Assuming that the engine rpm continues to increase, the transistors Q11 and Q12 will supply the approximately 6.2 volts through line 65 to the base of the transistor Q16 when the appropriate rpm is reached. This voltage is sufficiently high that it effectively overrides the fact that the transistor Q15 would be turned on. When the transistor Q16 is turned on, the transistor Q17 is turned off as mentioned above. Thereby, the vacuum advance is put back into the automobile engine at the higher speeds as desired above.

OPERATION OF ELECTRONIC TIMING RETARD

Figure 7:
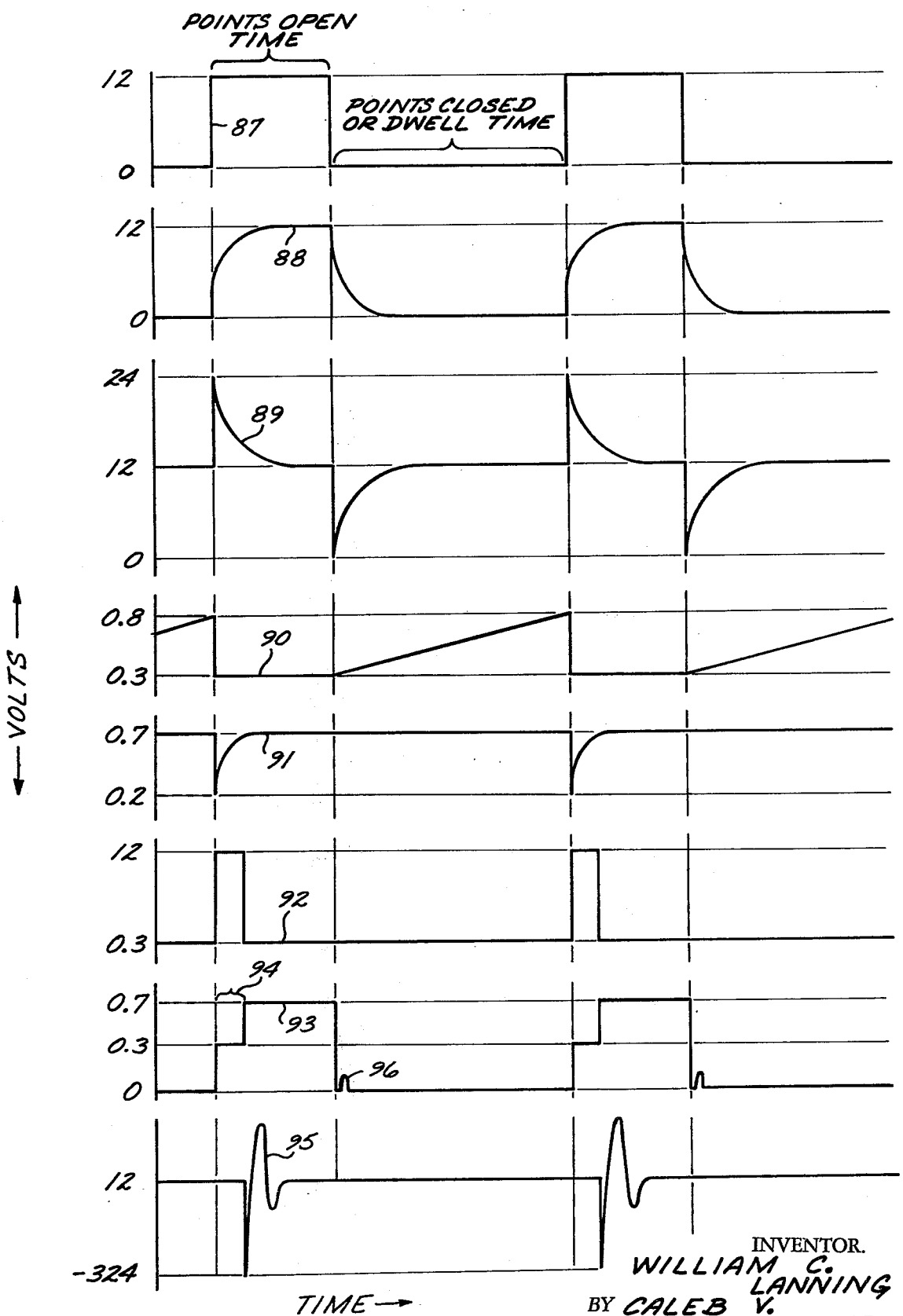
FIG. 7 is a set of curves disclosing the voltage at various points of the electronic retard system and the capacitive discharge system demonstrating the operation of the electronic retard system; and, FIG. 8 is a pictorial view of a preferred mechanical embodiment of the present invention.

Referring now to FIGS. 3 and 7 in particular, the electronic timing retard 11 will be described in further detail. In FIG. 7, line 87 shows the voltage at point 87 (on FIG. 3) when the points 10 are opened and when the points are closed. As can be seen, the point 87 is at battery potential, approximately 12 volts when the points 10 are open, and then dropped to zero when the points are closed.

As mentioned previously, the present system has the advantage that there is an initial surge of current of in the order of 1 amp through the points for a brief instant, and then the current drops to approximately one eleventh of that amount. More particularly, while the points are open, the capacitor C1 is discharged to battery potential on both sides of it. Then, when the points are closed again, capacitor C1 is charged through the resistor R2 (which is 10 ohms), and then, further current flow through both resistor R1 which is 100 ohms and resistor R2 so that further current is only approximately 0.1 amps with a 12 volt battery 48. On FIG. 7, the line 88 discloses the voltage of point 88 on FIG. 3.

On FIG. 7, line 89 discloses the voltage at point 89 on FIG. 3. As the point 87 is connected to the point 89 by capacitor C2, the point 89 is instantly raised to approximately 24 volts when the points 10 open. Then, the capacitor C2 is discharged back down to battery voltage through resistor R3 (at a rate determined by the time constant associated with the resistor R3 and the capacitor C2). Then, at the instant of point closure the point 89 (because of the capacitor C2) decreases 12 volts, from its nominal level of 12 volts to zero volts, instantaneously; its recovery rate of discharge back to its nominal level again, being determined by the time constant of resistor R3 and capacitor C2. When the points 10 are closed, the transistor Q1 is off (except at higher speeds as will be described below). Because the curve at point 89 is a differential curve, and because the resistor R4 and capacitor C3 are an integrating network, the voltage waveform at point 90 is a straight line during the charging of the capacitor C3 — as shown by line 90 in FIG. 7. In other words, the fact that the integrator charging voltage is a differentiated signal of the point voltage, a voltage ramp is created charging the capacitor C2 rather than the characteristic exponential wave form which normally evolves from charging a capacitor through a resistor from a constant voltage source. The voltage ramp characteristic provides the means of maintaining a constant retard level in number of degrees of crankshaft rotation over the various range of speeds of the engine. The voltage ramp is created during the points dwell time. During the points open time, the voltage on the input of the capacitor C3 is shunted to ground because the transistor Q1 is saturated, and remains at approximately 0.3 volts.

When the points 10 open and the point 90 is dropped to the voltage across the saturated transistor Q1, point 91 on the output side of the capacitor C3 drops an amount equal to the drop in point 90 turning the transistor Q2 off. Then, the voltage at point 91 rises back to approximately 0.7 volts the voltage across the base to emitter of the transistor Q2 when the transistor Q2 is turned back on to saturation. The amount of time that the transistor Q2 is off depends upon two things. Firstly, it depends upon the position of the switch S1. If the switch S1 is connected to, e.g., resistor R7, the recharging is accomplished considerably faster than if the switch S1 were connected to, e.g., resistor R10. As mentioned previously, in the illustrated system, if the switch S1 were connected to the resistor R7 there would be a 2° retard, there would be a 4° retard if the switch S1 were connected to the resistor R8, and there would be an additional 2° increase in the retard as the switch is moved each step from the resistor R8 to the resistor R9, to resistor R10, to resistor R11, and then to resistor R12.

The amount of time that the transistor Q2 is off, is also dependent upon the height of the voltage ramp at point 90 at the time that the points 10 are open. As the slope of the ramp is set by the resistors R3 and R4 (and the capacitor C2) there will be less voltage drop at the point 90 when the points 10 open if the engine is operating faster. Therefore, in such case, there will be less time needed to bring point 91 back up to the point where the transistor Q2 is turned on as the initial drop in voltage at point 91 is equal to the drop in voltage at point 90 when the points 10 are opened. By virtue of this, the different engine speeds have a minimal affect on the amount of spark retard as measured in engine degrees.

By line 92, there is shown the voltage potential at point 92 in FIG. 3 at the collector of the transistor Q2. As illustrated by the line 92, the point 92 varies between battery voltage and a voltage across the transistor Q2 when it is saturated, e.g., 0.3 volts.

Line 93 in FIG. 7 illustrated the voltage potential at point 93 in FIG. 3 at the collector of the transistor Q3. The transistor Q3 is turned on when the points 10 are open and must remain on until the transistor Q2 is turned on, at which time the transistor Q3 is turned off.

As can be seen, the base of the transistor Q4 is connected to the points 10 throuth the resistors R15 and R16. When the points 10 are opened, the base of the transistor Q4 and point 93 will rise. However, by virtue of transistors Q1 and Q2 turning on transistor Q3, the voltage at point 93 cannot rise above approximately 0.3 volts. This is insufficient to turn the transistor Q4 on. Then at such time as the transistor Q2 is turned back on, the transistor Q3 turns off — allowing the voltage at point 93 to rise to 0.7 volts which is the base to emitter voltage drop across the transistor Q4 when it is turned on. The amount of this delay is indicated by brace 94 which is adjacent the line 93 in FIG. 7.

The delayed ignition signal is then inverted by transistor Q4 with boot strap filtering being provided by the capacitor C5 connected between the collector and base of the transistor.

The capacitor C5 is a bootstrap noise filter as for example, the capacitor C16. In this case, it also functions to delay the shift of the base of the transistor Q4 until after the delay circuit signal arrives in the event that the points signal arrives at point 93 first.

The transistor Q5 then reinverts the signal from the transistor Q4, yielding the same wave form that was generated by the transistor Q3, but from a lower source impedance which can be used to drive the silicon controlled rectifier SCR.

When the points 10 are closed each time, there is a tendency for them to partially open again as they tend to bounce. Because of this, there is the problem that there might be a spike a few milliseconds in duration of 4 or 5 volts appearing at the base of the transistor Q4 if steps were not taken to prevent this. This is prevented by providing capacitor C4 which filters any such spurious spiking to ground. By the use of the capacitor C4, the spurious spiking is reduced to a minimal amount as indicated by the small spike 96 on line 93, which spurious spike is insufficient to turn the transistor Q4 on.

The system is further protected from spurious spikes at point 93 by capacitor C5 connected between the base and collector of fhe transistor Q4. If a spurious spike were to appear at the base of the transistor Q4 and tend to turn the transistor on, this would tend to reduce the potential of the collector of transistor Q4. And this— through the capacitor C5—would negate the increased voltage at the base of the transistor Q4. Thus returning the transistor Q4 to the more off state.

As mentioned above, it is desired that the electronic retard be deactivated after the vehicle has reached approximately 35 mph. As also mentioned above, the high rpm control level detector 15 supplies a voltage of approximately 6.2 volts along the line 21 when the desired rpm is reached such that the vehicle is going approximately 35 mph. When such voltage is applied to line 21, the transistor Q1 is turned on, and cannot be turned off regardless of the points 10 opening and closing. As the transistor Q1 cannot turn off, the point 90 cannot increase in potential, i.e., cannot produce the voltage ramp. Because of this, there is no negative impulse at point 91 which could serve to turn off temporarily the transistor Q2. And, as the transistor Q2 cannot turn off, the transistor Q3 would remain off at all times. In this condition, the signal from the point C would cause the point 93 to immediately rise to battery voltage, turning on the transistor Q4, turning off the transistor Q5, and firing the rectifier SCR.

In order to compensate for temperature changes, there is a resistor R6 connecting the base of the transistor Q1 to ground. This provides a steady drain in order to eliminate the possibility of spurious turning of the transistor on.

OPERATION OF CAPACITIVE DISCHARGE IGNITION.

As mentioned above, the saturating core oscillator provides (from the secondary winding W3 through the bridge rectifier B1) approximately 336 volts which is supplied to the anode side of the rectifier SCR. On the rising edge of the output signal from the transistor Q5

(i.e., the delayed ignition signal) the rectifier SCR is turned on, shorting the power supply to ground through the diode D1. The voltage on the anode of the SCR becomes almost zero within approximately 250 nano seconds. The voltage at point B is normally 12 volts from the induction coil voltage provided through the ignition switch. When the rectifier SCR is turned on, this voltage point at point B is reduced, essentially instantaneously, to approximately −324 volts.

The gate of the rectifier SCR turns itself off as the resistor R20 charges the capacitor C7. This allows +336 volts to return to the anode of the rectifier SCR through the time constant created by the inductance and resistance of the vehicle induction coil and the capacitor C8. The characteristic response of the voltage on point B with this phenomena is illustrated by line 95 in FIG. 7.

As the standard ignition coil provides approximately a 100 to 1 step-up between the secondary and primary, there will be approximately a 32,600 volt available secondary voltage for firing the spark plugs of the engine.

INSTALLATION

Figure 8:
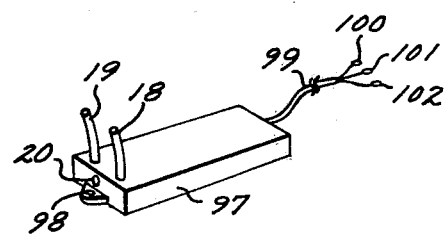

Of prime importance of the present invention is the fact that it can be installed very rapidly. First, the car is adjusted to manufacturer's specifications. As can be seen in FIG. 8, the system fits within a housing 97 having lugs 98 on either end. This permits the housing 97 to be rapidly attached to the inside of a front wheel well so that the housing can be grounded to the automobile. And, the electronic circuitry is grounded to the housing 97. As can be seen, the hose 18 to the vacuum advance unit, and the hose 19 which is connected to the vacuum from the carburetor merely come out of the housing 97. Then there is provided a wire 99 having three leads 100, 101, and 102 thereon. After the housing 97 is mounted in place, the three leads 100, 101, and 102 are connected to the two sides of the primary coil of the engine, and to the non-grounded side of the points 10. The primary coil connections each have an upstanding bolt which receives a nut for connecting wires. Therefore, by providing a ring at the end of each of the leads 100 and 101, the installer need merely take off the respective nuts, place on the leads, and replace the nuts. A nut and bolt is provided with the assembly for connection to the point wire from the distributor.

As the major pulse of electricity in this system is of negative polarity, it will be necessary to reverse the leads on the primary coil 13 in the installation process for those cars which are designed to have a charge of positive polarity going through the primary coil when the points close. This merely means that the installer would connect the end of the primary coil originally connected to the points, to the ballast resistor (and also to the present system as a power supply). The other end of the primary coil would be connected to the capacitive discharge ignition portion of the present system.

While only a few embodiments of the present invention have been shown and described in detail, it will be apparent to those skilled in the art that such is by way of illustration only and numerous changes may be made thereto without departing from the spirit of the present invention, and without limitation. For example, instead of providing switches S1 and S2, there could merely be provided at each respective point in the circuit a pair of jacks with each one of each pair being adapted to receive and frictionally hold a lead from a resistor. Then, at installation the desired resistor (or merely a wire if no resistor is desired) is inserted across the jacks of each pair respectively. Accordingly, it is our intention that the present invention be limited solely by the appended claims.

We claim:

1. In a control system for an internal combustion engine having a rotary output shaft, and a spark ignition system including ignition points, an ignition coil and a voltage source:
    electronic spark retard means for delaying the spark of the engine a predetermined number of degrees of output shaft rotation when said means is activated; and
    hysteresis control means for selectively activating said retard means and deactivating said retard means, said control means deactivating said retard means at a first predetermined engine speed during acceleration and activating said retard means at a second predetermined engine speed below said first speed during deceleration, said first and second predetermined engine speeds being independently predetermined.

2. In a control system for an internal combustion engine having a rotary output shaft, and a spark ignition system including ignition points, an ignition coil and a voltage source:
    electronic spark retard means for delaying the spark of the engine a predetermined number of degrees of output shaft rotation when said means is activated; and
    hysteresis control means for selectively activating said retard means and deactivating said retard means, said control means deactivating said retard means at a first predetermined engine speed during acceleration and activating said retard means at a second predetermined engine speed during deceleration, said first engine speed exceeding said second speed by a preset amount.

3. In a control system for an internal combustion engine having a rotary output shaft, and a spark ignition system including ignition points, an ignition coil and a voltage source:
    electronic spark retard means for delaying the spark of the engine a predetermined number of degrees of output shaft rotation when said means is activated; and
    hysteresis control means for selectively activating said retard means and deactivating said retard means, said control means deactivating said retard means at a first predetermined engine speed during acceleration and activating said retard means at a second predetermined engine speed during deceleration, said first and second predetermined engine speeds each independently selected to reduce emissions from said engine while protecting said engine from overheating.

4. In a control system for an internal combustion engine having a rotary output shaft, a vacuum advance connected between distributor of the engine, and a spark ignition system including ignition points, and ignition coil, and a voltage source;
    means for sensing the speed of said engine; and hysteresis means responsive to said sensing means for selectively activating and deactivating said vacuum advance, said means activating said vacuum advance when said engine is accelerating above a first predetermined engine speed, said means maintaining said vacuum advance activated during the deceleration of the engine until the engine reaches a second predetermined engine speed lower than said first predetermined engine speed by a preset amount and then deactivating vacuum advance when the engine reaches said lower second predetermined speed.

5. In a control system for an internal combustion engine having a rotary output shaft, a vacuum advance connected between distributor of the engine, and a spark ignition system including ignition points, and ignition coil, and a voltage source:

means for sensing the speed of said engine; and hysteresis means responsive to said sensing means for selectively activating and deactivating said vacuum advance, said means activating said vacuum advance during acceleration when said engine is above a first predetermined engine speed, said mean maintaining said vacuum advance activated during the deceleration of the engine unil the engine reaches a second predetermined engine speed lower than said first predetermined engine speed and then deactivating vacuum advance when the engine reaches said lower second predetermined speed, said first and second predetermined engine speeds each independently selected to reduce emissions from said internal combustion engine while protecting said engine from overheating.

6. In a control system for an internal combustion engine having a rotary output shaft, and a spark ignition system including ignition points, an ignition coil and a voltage source:

electronic spark retard means for delaying the spark of the engine a predetermined number of degrees of output shaft rotation when said means is activated; and hysteresis control means for selectively activating said retard means and deactivating said retard means, said control means deactivating said retard means at a first predetermined engine speed during deceleration and activating said retard means at a second predetermined engine speed during acceleration, said first and second predetermined engine speeds each independently selected to reduce emissions from said engine while protecting said engine from overheating.

7. In a control system for an internal combustion engine having a rotary output shaft, a vacuum advance connected between distributor of the engine, and a spark ignition system including ignition points, and ignition coil, and a voltage source:

means for sensing the speed of said engine; and hysteresis means responsive to said sensing means for selectively activating and deactivating said vacuum advance, said means activating said vacuum advance when said engine is below a first predetermined engine speed during engine deceleration, said means maintaining said vacuum advance activated during the acceleration of the engine until the engine reaches a second predetermined engine speed at least 10 percent higher than said first predetermined engine speed and then deactivating vacuum advance when the engine reaches said higher second predetermined speed.

8. In a control system for an interal combustion engine having a rotary output shaft, and a spark ignition system including ignition points, an ignition coil and voltage source:

electronic spark retard means for delaying the spark of the engine a predetermined number of degrees of output shaft rotation when said means is activated; and hysteresis control means for selectively activating said retard means and deactivating said retard means, said control means deactivating said retard means at a first predetermined engine speed during engine acceleration and activating said retard means at a second predetermined engine speed during engine deceleration, said second predetermined engine speed differing from said first predetermined engine speed by at least 10 percent.

9. The combination set forth in claim 8 wherein: said second predetermined engine speed is substantially lower than said first predetermined engine speed.

10. The combination set forth in claim 8 wherein said engine has a vacuum advance means which advances the spark of the engine as a function of the vacuum at the carburetor of the engine and including:

vacuum advance control means for selectively deactivating said vacuum advance means;

and means in said control means for controlling said vacuum advance control means to deactivate said vacuum advance at approximately said second predetermined engine speed and for activating said vacuum advance at approximately said first predetermined engine speed.

11. The combination set forth in claim 10 wherein: said last mentioned means activates said vacuum advance at a third predetermined engine speed which is only slightly above the normal idle speed of the engine.

12. The combination set forth in claim 8 wherein said retard means includes:

a first and a second transistor;

a first capacitor having an input side and an output side;

differentiating-integrating circuit means connected to the input side of said capacitor for charging the input side thereof linearly as a function of time each time the ignition points are changed from one of a closed state and open state to the other state;

circuit means connecting said second transistor to the engine ignition coil for passing current therethrough each time the second transistor is changed from a first state to a second state;

the output side of said capacitor being connected to said second transistor so as to change its state from the second state to the first state each time the points are changed to said other state;

and resistor circuit means connected to the output side of said capacitor and said second transistor for changing the state of said second transistor from said first state to said second state after a predetermined delay which is a function of how long the points are in said other state.

13. The combination set forth in claim 12 wherein said circuit means includes: a third and a fourth transistor, the base of said fourth transistor being connected through resistor means directly to said points, said base of said fourth transistor being connected to the collector of said fourth transistor through a capacitor so as to offset any small impulse if the points bounce somewhat when they are closed.

14. The combination set forth in claim 12 wherein: said first transistor is connected to turn off while the points are closed and turn on while the points are open, said first transistor being connected in series between the input side of said capacitor and ground so as to prevent a charge from building up on the input side of said capacitor while the points are open;

and said control means being connected to said first transistor and keeping it turned on continuously when it is desired that the retard means be deactivated.

15. The combination set forth in claim 8 wherein said control means comprises:

tachometer means for generating an output which is a function of the speed at which said points are opening and closing;

detector means connected to the output of said tachometer means for detecting when the output of the tachometer means reaches predetermined values, said tachometer means and detector means having transistors therein which are subject to operational change with increased operating temperatures;

circuit means in said tachometer means and said detector means for compensating for changes in the operating characteristics of the transistors in the tachometer means and the detector means with changes in the operating temperatures of the system.

16. The combination set forth in claim 15 wherein said tachometer means includes:

a plurality of transistors which turn on with less forward bias at higher temperatures, said transistors being connected together to tend to compensate for the reduction of forward bias necessary to turn on the transistors accompanying an increase in the temperature of the transistors so that the output of the tachometer means is not affected as much by an increase in the operating temperature of the system.

17. The combination set forth in claim 16 wherein:

said detector means includes a transistor connected to the output of the tachometer means, said last mentioned transistor requiring less forward bias to turn it on at higher temperatures, said last mentioned transistor being connected to said output of said tachometer means to further compensate for the effect of higher temperatures on the transistors in the tachometer means so that the electrical retard means is activated and deactivated at substantially the same engine speeds over a wide range of operating temperatures.

18. The combination set forth in claim 15 wherein said tachometer means includes:

a first and a second transistor;

the base of the first transistor being connected to the points so that said first transistor will be in a first state when the points are open and a second state when the points are closed;

a capacitor connecting the base of said first transistor to ground so that a stray impulse tending to occur at the base junction of the first transistor will be shunted to ground, whereby the first transistor will tend not to change state at an undesired time when the transistor is operating at a high temperature.

19. The combination set forth in claim 15 wherein said tachometer means includes:

a first and a second and a third transistor;

the bse of the first transistor being connected through resistor means to the points so that said first transistor will normally be in a first state when the points are open and be in a second state when the points are closed;

a capacitor having its input side connected to the voltage source through a resistor and to the collector of the first transistor, said capacitor becoming charged each time the points are closed, said capacitor having its output side connected to the base of said second transistor, said capacitor causing said second transistor, to change from a first state to a second state when the capacitor becomes charged each time the points are open and permitting the second transistor to return to its first state when the capacitor becomes discharged;

control resistor means connecting the voltage source to the output side of said capacitor and to said base of said second transistor whereby the value of the control resistor means determines the length of time that it takes to discharge said capacitor sufficiently to permit said second transistor to return to its first state;

and integrator circuit means connecting the output of said second transistor to the third transistor for generating an analog output at the third transistor which is a direct function of the length of time that the second transistor is in said second state each time the points are opened and the speed at which the points are opened and closed.

20. The combination set forth in claim 19 wherein said tachometer means includes:

a first and a second transistor;

the base of the first transistor being connected to the points so that said first transistor will be in a first state when the points are open and a second state when the points are closed;

a capacitor connecting the base of said first transistor to ground so that a stray impulse tending to occur at the base junction of the first transistor will be shunted to ground, whereby the first transistor will tend not to change state at an undesired time when the transistor is operating at a high temperature.

21. The combination set forth in claim 19 including:

a tachometer line, said output line being connected directly to the emitter of said third transistor and being connected to ground through resistor means.

22. The combination set forth in claim 19 including:

feedback means connecting the collector of said second transistor to the base of said first transistor for preventing said first transistor from changing from said second state back to said first state so long as said second transistor is in its second state even though the engine speed is so fast that said points are closed again before said second transistor returns to its first state.

23. The combination set forth in claim 19 wherein:

said integrator circuit means includes: a diode in series therewith for preventing current flow in the opposite direction to that desired.

24. In a control system for an internal combustion engine having a rotary output shaft, a vacuum advance connected between distributor of the engine, and a spark ignition system including ignition points, and ignition coil, and a voltage source;

means for sensing the speed of said engine; and hysteresis means responsive to said sensing means for selectively activating and deactivating said vacuum advance, said means activating said vacuum advance when said engine is above a first predetermined engine speed during engine acceleration, said means maintaining said vacuum advance activated during the deceleration of the engine until the engine reaches a second predetermined engine speed at least 10 percent lower than said first predetermined engine speed and then deactivating vacuum advance when the engine reaches said lower second predetermined speed.

25. The combination set forth in claim 24 wherein:
as said engine is slowed from said second predetermined speed the vacuum advance remains deactivated until the engine slows to a third predetermined speed slightly above the idle speed of the engine at which point the means reactivates the vacuum advance.

26. The combination set forth in claim 24 wherein:
said means deactivates said vacuum advance after said engine is accelerated from idle to a speed below said first predetermined speed, said means deactivating the vacuum advance during continued acceleration of the engine until said first predetermined engine speed is reached where the vacuum advance is reactivated.

27. In a control system for an internal combustion engine having a rotary output shaft, and a spark ignition system including ignition points, an ignition coil, a voltage source and a vacuum advance means which advances the spark of the engine as a function of the vacuum at the carburetor of the engine;
vacuum advance control means for selectively deactivating said vacuum advance control means; and
hysteresis means in said control means for controlling said vacuum advance control means to deactivate said vacuum advance at approximately a second predetermined engine speed during deceleration and for activating said vacuum advance at approximately a first predetermined engine speed during acceleration differing by at least 10 percent from said second predetermined speed.

28. The combination set forth in claim 27 including:
a housing enclosing said above mentioned means, said housing being adapted to be grounded to a portion of an automobile with which the system is used;
three wires extending from said housing adapted to be connected to the non-grounded side of the points and to the two sides of the ignition coil, whereby said system within the housing can be rapidly installed in substantially any automobile.

29. The combination set forth in claim 27 wherein said tachometer means includes:
a plurality of transistors which turn on with less forward bias at higher temperatures, said transistors being connected together to tend to compensate for the reduction of forward bias necessary to turn on the transistors accompanying as increase in the temperature of the transistors so that the output of the tachometer means is not affected as much by an increase in the operating temperature of the system.

30. The combination set forth in claim 29 wherein:
said detector means includes a transistor connected to the output of the tachometer means, said last mentioned transistor requiring less forward bias to turn it on at higher temperatures, said last mentioned transistor being connected to said output of said tachometer means to further compensate for the effect of higher temperatures on the transistors in the tachometer means so that the electrical retard means is activated and deactivated at substantially the same engine speeds over a wide range of operating temperatures.

31. The combination set forth in claim 27 wherein said control means comprises:
tachometer means for generating an output which is a function of the speed at which said points are opening and closing;
detector means connected to the output of said tachometer means for detecting when the output of the tachometer means reaches predetermined values, said tachometer means and detector means having transistors therein which are subject to operational change with increased operating temperatures;
circuit means in said tachometer means and said detector means for compensating for changes in the operating characteristics of the transistors in the tachometer means and the detector means with changes in the operating temperatures of the system.

32. The combination set forth in claim 31 wherein said tachometer means includes:
a first and a second transistor;
the base of the first transistor being connected to the points so that said first transistor will be in a first state when the points are open and a second state when the points are closed;
a capacitor connecting the base of said first transistor to ground so that a stray impulse tending to occur at the base junction of the first transistor will be shunted to ground, whereby the first transistor will tend not to change state at an undesired time when the transistor is operating at a high temperature.

33. The combination set forth in claim 31 wherein said tachometer means includes:
a first and a second and a third transistor;
the base of the first transistor being connected through resistor means to the points so that said first transistor will normally be in a first state when the points are open and be in a second state when the points are closed;
a capacitor having its input side connected to the voltage source through a resistor and to the collector of the first transistor, said capacitor becoming charged each time the points are closed, said capacitor having its output side connected to the base of said second transistor, said capacitor causing said second transistor, to change from a first state to a second state when the capacitor becomes charged each time the points are open and permitting the second transistor to return to its first state when the capacitor becomes discharged;
control resistor means connecting the voltage source to the output side of said capacitor and to said base of said second transistor whereby the value of the control transistor means determines the length of time that it takes to discharge said capacitor sufficiently to permit said second transistor to return to its first state;
and integrator circuit means connecting the output of said second transistor to the third transistor for generating an analog output at the third transistor which is a direct function of the length of time that the second transistor is in said second state each time the points are opened and the speed at which the points are opened and closed.

34. The combination set forth in claim 33 wherein said tachometer means includes:
- a first and a second transistor;
- the base of the first transistor being connected to the points so that said first transistor will be in a first state when the points are open and a second state when the points are closed;
- a capacitor connecting the base of said first transistor to ground so that a stray impulse tending to occur at the base junction of the first transistor will be shunted to ground, whereby the first transistor will tend not to change state at an undesired time when the transistor is operating at a high temperature.

35. The combination set forth in claim 33 including: a tachometer line, said output line being connected directly to the emitter of said third transistor and being connected to ground through resistor means.

36. The combination set forth in claim 33 including:
feedback means connecting the collector of said second transistor to the base of said first transistor for preventing said first transistor from changing from said second state back to said first state so long as said second transistor is in its second state even though the engine speed is so fast that said points are closed again before said second transistor returns to its first state.

37. The combination set forth in claim 33 wherein:
said integrator circuit means includes:
- a diode in series therewith for preventing current flow in the opposite direction to that desired.

* * * * *

UNITED STATES PATENT AND TRADEMARK OFFICE
CERTIFICATE OF CORRECTION

PATENT NO. : 4,140,092
DATED : February 20, 1979
INVENTOR(S) : William C. Lanning and Caleb V. Swanson It is certified that error appears in the above-identified patent and that said Letters Patent are hereby corrected as shown below:

Column 1, line 39, change "lss" to --loss--.

Column 1, line 65, change "13°" to --12°--.

Column 3, line 49, change "Inspection" to --inspection--.

Column 4, line 29, change "ahving" to --having--.

Column 5, line 46, after "selected", insert --desired--.

Signed and Sealed this

Fifth Day of June 1979

[SEAL]

Attest:

RUTH C. MASON
Attesting Officer

DONALD W. BANNER
Commissioner of Patents and Trademarks